United States Patent
Ochrombel

(10) Patent No.: US 9,808,966 B2
(45) Date of Patent: Nov. 7, 2017

(54) PROCESS FOR MAKING MOLDED DEVICES

(71) Applicant: Novartis AG, Basel (CH)

(72) Inventor: Rene Ochrombel, Bergheim (DE)

(73) Assignee: Novartis AG, Basel (CH)

( * ) Notice: Subject to any disclaimer, the term of this patent is extended or adjusted under 35 U.S.C. 154(b) by 358 days.

(21) Appl. No.: 14/549,636

(22) Filed: Nov. 21, 2014

(65) Prior Publication Data

US 2015/0151461 A1     Jun. 4, 2015

Related U.S. Application Data

(60) Provisional application No. 61/910,632, filed on Dec. 2, 2013.

(51) Int. Cl.
*B29C 39/02* (2006.01)
*B29D 11/00* (2006.01)
(Continued)

(52) U.S. Cl.
CPC .......... *B29C 39/026* (2013.01); *B29C 33/424* (2013.01); *B29C 33/428* (2013.01);
(Continued)

(58) Field of Classification Search
CPC ........ B29D 11/00336; B29D 11/00519; B29C 39/026; B29C 39/006; B29C 33/424; B29C 33/428; B29C 33/52
See application file for complete search history.

(56) References Cited

U.S. PATENT DOCUMENTS

| 7,384,590 B2 | 6/2008 | Kelly |
| 7,387,759 B2 | 6/2008 | Kelly |

(Continued)

FOREIGN PATENT DOCUMENTS

| EP | 1158339 A1 | 11/2001 |
| EP | 1820619 A1 | 8/2007 |
| WO | 2011045376 A1 | 4/2011 |

OTHER PUBLICATIONS

PCT International Search Report dated Jan. 30, 2015, International Application No. PCT/EP2014/075266, International Filing dated Nov. 21, 2014.

(Continued)

*Primary Examiner* — Mathieu Vargot
(74) *Attorney, Agent, or Firm* — Jian Zhou

(57) ABSTRACT

This invention is directed to a process for applying a symbol to a molded device which symbol on the molded device is visible as an indentation in the surface of the device. The process involves the step of applying the symbol as an elevation to the mold before using the mold for making the molded device. The process of the invention is characterized in that the elevation on the mold is produced by applying a material to the mold surface which material is liquid when being applied and which material is applied at a temperature higher than the temperature which is at or preferably below the melting point of the material, and which material solidifies at the temperature of the mold. The material applied to the mold and solidified on the mold surface as an elevation needs to remain solid during the process of using the mold for making the molded device. During the molding process the elevation of the symbol on the mold is transferred as an indentation of the symbol to the surface of the molded device. After the molding process is complete and the molded device has been separated from the mold the elevation on the mold surface can be removed and the mold can be re-used without an elevation or with another elevation being applied to make another molded device.

16 Claims, 1 Drawing Sheet

(51) Int. Cl.
   *B29C 33/42* (2006.01)
   *B29C 33/52* (2006.01)
   *B29C 39/00* (2006.01)
   B29K 83/00 (2006.01)
   B29L 11/00 (2006.01)
   B29C 37/00 (2006.01)

(52) U.S. Cl.
   CPC ............ *B29C 33/52* (2013.01); *B29C 39/006* (2013.01); *B29D 11/00336* (2013.01); *B29D 11/00519* (2013.01); *B29C 2037/0035* (2013.01); *B29K 2083/00* (2013.01); *B29L 2011/0041* (2013.01)

(56) References Cited

U.S. PATENT DOCUMENTS

| | | | |
|---|---|---|---|
| 8,480,227 B2 | 7/2013 | Qiu | |
| 2001/0013921 A1* | 8/2001 | Wu | B29D 11/00317 351/159.69 |
| 2007/0228619 A1* | 10/2007 | Kawaguchi | B29C 33/40 264/496 |

OTHER PUBLICATIONS

PCT Written Opinion of the International Searching Authority dated Jan. 30, 2015, International Application No. PCT/EP2014/075266, International Filing dated Nov. 21, 2014.

\* cited by examiner

PROCESS FOR MAKING MOLDED DEVICES

This application claims the benefits under 35 USC §119 (e) of U.S. provisional application No. 61/910,632 filed Dec. 2, 2013, incorporated by reference in its entirety.

This invention is directed to a process for producing molded devices (preferably ophthalmic lenses, more preferably contact lenses), each of which comprises at least one molded mark (i.e., a visible symbol as an indentation) in the surface of the molded device. The process involves the step of applying the symbol as an elevation to a molding surface of a mold before using the mold for making the molded device. The process of the invention is characterized in that the elevation on the mold surface is produced by depositing, onto the molding surface having a first temperature, a liquid material having a second temperature higher than the first temperature, and solidifying the liquid material on the molding surface upon cooling toward to the first temperature. The solidified material on the molding surface as an elevation needs to remain solid during the process of using the mold for making the molded device. During the molding process the elevation of the symbol on the mold is reproduced as an indentation of the symbol (or an indented symbol) on the surface of the molded device. After the molding process is complete and the molded device has been separated from the mold the elevation on the mold surface can be removed and the mold can be re-used without an elevation or with another elevation being applied to make another molded device.

The invention is in particular suitable for molded devices such ophthalmic devices, in particular for contact lenses.

BACKGROUND

Manufacture of mass production molded devices, such as contact lenses, is typically conducted by cast-molding of a reactive composition (or a lens-forming formulation or composition) in a mold comprising a first (e.g., female) mold half having a first molding surface defining one of the two opposite surfaces of a contact lens and a second (e.g., male) mold half having a second molding surface defining the other surface of the contact lens. A lens (device) forming composition (formulation) is dispensed into the female mold half followed by closing the mold by attaching the male mold half onto the female mold. The cavity between the first and second molding surfaces of the mold in closed state defines the form of the contact lens to be molded. In order to transform the lens forming formulation within the mold pair into a contact lens said formulation is polymerized or crosslinked.

Thereafter the mold halves are separated and the formed contact lens is demolded. The contact lens is further processed, and the mold is dispensed, or in the case of re-usable molds, cleaned and dried, and used for manufacture of further contact lenses. A process as described hereinbefore is generally independent of the mold material used or the lens forming formulation used. To meet the needs of as many patients as desirable it is important to manufacture contact lenses having a variety of different parameters or parameter combinations. Examples for such parameters are the power of a contact lens, or information about the angle of a toric axis in case of toric contact lenses (i.e., orientation marks), inversion marks for facilitating lens handlings, or manufacturing data or shelf life data or expiry information relating to a contact lens.

In order to avoid any mixup or confusion after manufacture of a contact lens it is most desirable to connect the respective parameters or data with each individual contact lens instead of simply printing said parameters only on primary or secondary packages. A convenient method of marking a contact lens directly with such parameters consists of transferring a symbol or a pattern from a lens mold to a contact lens.

In order to achieve this it is known to create a symbol to the surface of a mold, either as an indentation on the mold or as an elevation on the mold. Said indentation or elevation is then reproduced on the contact lens during the molding process such that an indentation in the mold results in a corresponding elevation on the contact lens while an elevation in the mold results in a corresponding indentation on the contact lens.

The indentation or elevation on the mold in those known processes for applying a symbol to a contact lens is a fixed and permanent element of the mold. It cannot be changed or varied. Re-usable molds of this type having a permanent indentation or elevation, therefore, can be used only for the manufacture of the specific type of contact lens described by said permanent indentation or elevation. This fact requires a manufacturer of contact lenses to have a large stock of molds carrying indentations or elevations needed for the many different types of parameters which are to be applied to a contact lens.

Another problem related to molds having permanent indentations or elevations exists in the area of accumulation of debris or other undesired material. This may have the effect of such material masking the original indentation or elevation resulting in poor visibility/readability of the intended symbol. In the alternative, the debris or other undesired material may be transferred to the contact lens during the molding process which is also an undesired effect.

In view of the disadvantages shortly addressed hereinbefore there is still a need to develop an improved process for marking a contact lens on its surface with a symbol avoiding or overcoming said disadvantages. Such a process is disclosed herein in the specification and claims of this patent document.

SUMMARY

In one aspect the invention relates to a process for producing a device (preferably an ophthalmic device, more preferably a contact lens) having a molded, visible symbol therein, the process comprising the step of: applying a symbol as an elevation to a molding surface of a mold before using the mold for cast-molding the device, wherein the elevation on the molding surface is produced by depositing, onto a molding surface of a mold having a first temperature, a material in liquid state and having a second temperature which is higher than the first temperature which is at or preferably below the melting point of the material, and then by solidifying the material on the molding surface as the elevation through cooling toward to the first temperature; introducing a device forming composition into the mold with the symbol as the elevation on the molding surface; and polymerizing or crosslinking the device forming composition in the mold to form the device having the molded, visible symbol as an indentation which is a reproduction of the symbol as the elevation on the molding surface, provided that the elevation on the molding surface remains solid during the step of polymerizing or crosslinking the device forming composition.

In another aspect the invention relates to a mold for making a device (preferably ophthalmic lenses, more preferably contact lenses) having a molded, visible symbol therein in a cast molding process, comprising a symbol on a molding surface of the mold, wherein the symbol is an elevation raising vertically from the molding surface and is obtained by deposing, onto the molding surface of the mold having a first temperature, a material in liquid state and having a second temperature which is higher than the first temperature which is at or preferably below the melting point of the material, and then by solidifying the material on the molding surface as the elevation through cooling toward to the first temperature, wherein the symbol is characterized by its capabilities to remain solid during the cast molding process from a device forming composition and to be removed with a solvent having a third temperature equal to or higher than the first temperature.

In a further aspect the invention relates to use of a mold of the invention as described in the above paragraph for making devices (preferably ophthalmic lenses, more preferably contact lenses) having a molded symbol therein. The use of a mold of the invention comprises the step of applying a symbol as an elevation to the mold before using the mold for making a device, characterized in that the elevation on the mold is produced by deposing, onto the molding surface of the mold having a first temperature, a material in liquid state and having a second temperature which is higher than the first temperature which is at or preferably below the melting point of the material, and then by solidifying the material on the molding surface as the elevation through cooling toward to the first temperature, wherein the symbol is characterized by its capabilities to remain solid during the cast molding process from a device forming composition and to be removed with a solvent having a third temperature equal to or higher than the first temperature.

In a still further aspect the invention relates to use of a material in a process for producing a device (preferably ophthalmic device, more preferably a contact lens) with a molded visible symbol therein which is an indentation in the surface of the device. Such a use comprises the step of applying a symbol as an elevation to a molding surface of a mold before using the mold for cast-molding the device, characterized in that the elevation on the mold is produced by deposing, onto the molding surface of the mold having a first temperature, a material in liquid state and having a second temperature which is higher than the first temperature which is at or preferably below the melting point of the material, and then by solidifying the material on the molding surface as the elevation through cooling toward to the first temperature, wherein the symbol is characterized by its capabilities to remain solid during the cast molding process from a device forming composition and to be removed with a solvent having a third temperature equal to or higher than the first temperature, wherein the melting point of the material is from 15° C. and 60° C. (preferably between 18° C. and 60° C., even more preferred between 18° C. and 38° C.), is soluble in or can be rinsed off by at least one of water, propanol or methyl ethyl ketone at or above its melting point, and is at least temporarily resistant to the device forming composition for cast-molding the device.

BRIEF DESCRIPTIONS OF THE DRAWINGS

DETAILED DESCRIPTION

Figure 1:
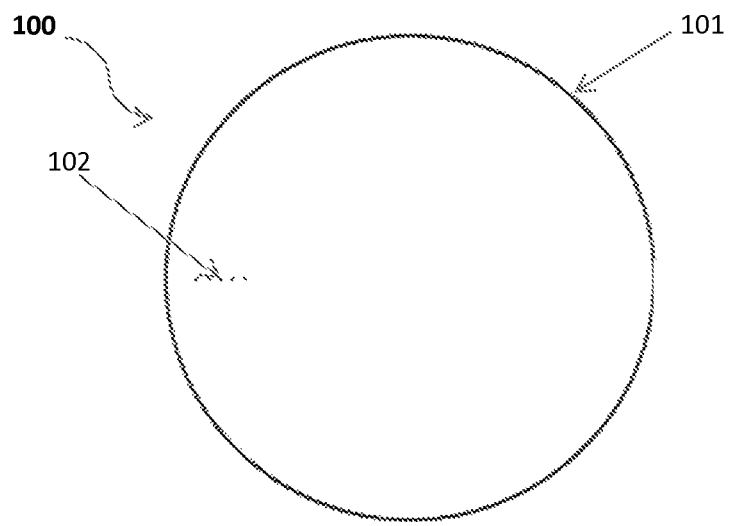
FIG. 1 shows a contact lens with a molded visible symbol therein according to a preferred embodiment.

"About" as used herein means that a number referred to as "about" comprises the recited number plus or minus 1-10% of that recited number.

A "molding surface" of a mold refers to a mold's surface which is in direct contact with a device forming composition for forming a device.

A molded device is preferably an ophthalmic lens, such as an intraocular lens or a contact lens, and most preferred a contact lens.

A symbol to be applied to a molded device can be a pattern or alpha-numerical information or a picture, or a combination thereof. Alpha-numerical information can be a number, a date, such as a manufacturing date or an expiry date, a lot number, toricity information (e.g., orientation marks), inversion marks, or text without or including numbers. A pattern can be an arrangement of dots. Also alpha-numerical information or a picture can be provided by an arrangement of individual dots. A suitable and typical size (diameter) of an individual dot on a contact lens is for example about 100 micrometer.

The term "visible" in reference to a symbol as an indentation in a molded device is not necessarily meant visibility to the naked eye. As many molded articles, and for example contact lenses, are small objects, an indentation on the surface thereof is even substantially smaller and may be visible only by magnification. However, "visible" in the context of this invention means that the symbol can be identified on the surface of the molded device by careful inspection, for example in order to identify certain properties of the molded device.

Correspondingly the term "indentation" also, with reference to the often small size of the molded device, needs to be understood as a small object on the surface of the molded device, typically not deeper than 40 micrometers, preferably not deeper than 20 micrometers.

As the indentation on the molded device and the elevation on the mold surface correspond in size and in form, said elevation on the mold surface is also a small object on the surface of the mold, and corresponding dimensions apply, such that an elevation is typically not higher than 40 micrometers, preferably not higher than 20 micrometers.

The final form of the symbol to be applied is the form visible on the molded device. In cases of corresponding symmetry of the symbol the form of the symbol to be applied to the mold can be the same as the symbol to be seen on the molded device. This is the case, for example, for the letter "H". However, the situation is different for example for the two letter combination "Ab". If such two letter combination shall appear as an indentation on the final molded device, the symbol to be applied as an elevation to the mold needs to be "dA". A person skilled in the art will know about this kind of symmetry requirements, and for convenience, both the elevation on the mold as well as the indentation on the molded article will be named by the same term "symbol".

The material to be applied to the mold is a pure compound or a mixture of compounds and has a melting point. Said material is a liquid when being applied, it is applied at a temperature higher than the temperature of the mold (which is at or preferably below the melting point of the material), and it solidifies at the temperature of the mold, and it remains solid during the process of using the mold for making the molded device.

The temperature of the material to be applied onto a molding surface of a mold is about 2° to about 50° C., preferably about 2° to about 20° C., more preferably about 2° to about 10° C., even more preferably about 2° to about 5° C. higher than the temperature of the mold in the context of this invention.

In principle, the difference in temperature is not the only parameter which is relevant. Another parameter is the volume of the applied material relative to the volume of the mold, and the thermal coefficients of the applied material and the mold. The larger the volume of the mold and the smaller the volume of the applied material, the larger the temperature difference between the two is allowed to be, and the relatively low temperature of the large volume of the mold compared to the relatively high temperature of the material to be applied will still achieve the desired effect, namely to solidify the small volume of the (relatively warm) applied material. Vice versa, if volume and or heat capacity of a mold are limited, then the temperature difference between mold and material to be applied may not be large because a small volume of a mold will achieve the desired effect, namely to solidify the volume of the applied material, only if the applied material does not require much cooling.

However, in the context of contact lens manufacture due to the effective volume of the material applied to the mold surface, and the effective volume of the mold, parameters like thermal diffusivity, thermal conductivity and specific heat can be neglected. Once the applied material has contact to the mold surface it undergoes phase transition to solid state, due to the effective temperature difference.

Another parameter is the temperature at which the process of using the mold for making the molded device is conducted. This involves for example the temperature of the composition introduced into the mold for forming the molded device, and the resulting temperature within the mold during the process of using the mold. If said temperature is about the same as the temperature of the mold or if it is a lower temperature one can expect that the material applied to the mold in the form of a symbol remains solid during forming the molded device. As the person skilled in the art will understand it is important that said material remains solid at that time because otherwise it will easily mix with the composition to form the molded device, and there will not result the desired symbol on the surface of the molded device.

Taking into account the above several temperatures are relevant in the context of this invention: The application temperature of the material, the temperature at which said material solidifies (the melting point), and the temperature of the mold as well as the temperature within the mold during the process of using the mold.

The application temperature of the material can be chosen by using a material in liquid form or by using a material after melting the material or by raising the temperature further if desired.

The temperature at which a material solidifies (more conveniently known as the melting point) can be influenced by selecting a material with a suitable melting point. A melting point in the vicinity of room temperature is preferred, such as, preferably from 15° C. and 60° C., more preferably from about 18° C. to about 50° C., even more preferably from about 18° C. to about 38° C. If necessary or desired the melting point of a material can be reduced by addition of e.g. salts, as known to a person skilled in the art.

It is understood that the temperature of the mold as well as the temperature within the mold during the process of using the mold (also called "process temperature") typically will be room temperature, or very close to room temperature, such as 23±7° C., more preferably 23±4° C.

Materials suitable for use in the process of the invention preferably have a melting point between 15° C. and 60° C., more preferably between 18° C. and 50° C., even more preferred between 18° C. and 38° C., and preferably but not necessarily they do not belong to goods classified as dangerous, they are soluble in or can be rinsed off by at least one of water, propanol or methyl ethyl ketone at or above their melting point, and they are at least temporarily resistant to the composition for forming the molded device. Temporarily means at least about 10 seconds, preferably at least about 30 seconds, more preferably at least about 2 to 3 minutes. Resistant means that the solidified material for such a period of time remains in solid form, and does not dissolve in the composition for forming the molded device.

Materials which can be used in the process of the invention, and preferably materials having a melting point in the vicinity of room temperature and for use with a mold temperature and a process temperature both being at room temperature or very close to room temperature are for example alcohols or alkanes.

Within the materials useful in this invention suitable alcohols are e.g. hexane-1,6-diol (CAS-Nr. 629-11-8) with a melting point of 39-42° C., and 1-tetradecanol (CAS-Nr. 112-72-1) with a melting point of 38° C.

Within the materials useful in this invention suitable alkanes are e.g. nonadecane (CAS-Nr. 629-92-5) with a melting point of 32-34° C., and tetracosane (CAS-Nr. 646-31-1) with a melting point of about 58° C.

Selection of a specific material for application in applying a symbol to a specific molded device will also depend on properties of the material such as solubility in the composition to form the molded device (undesired) and properties such as solubility or miscibility in cleaning solutions used for cleaning the mold after a manufacturing cycle or in extracting solutions used for extracting the molded device (desired).

It is desirable if the material at extraction of the molded device is soluble or can be rinsed off, if necessary by raising the temperature to a temperature at or above the melting point. It is in particular desirable if the material below, at or above the melting point can be rinsed off by water, 1-propanol, 2-propanol or methyl ethyl ketone, or if it is soluble in water, 1-propanol, 2-propanol or methyl ethyl ketone. Solubility or the ability of being rinsed off in one of those solvents is sufficient. However, the material should be insoluble in or at least temporarily resistant to the composition to form the molded device in the mold.

The process of the invention is independent of the composition to form the molded device as long as solubility of the material in the composition does not become an issue. In the context of contact lenses commonly used contact lens materials are suitable, in particular those which can be processed in the so called Light Stream Process. An especially suitable material is a silicone hydrogel material. Examples of silicone hydrogel materials include without limitation, delefilcon A, lotrafilcon A, lotrafilcon B, balafilcon A, galyfilcon A, senofilcon A, narafilcon A, narafilcon B, comfilcon A, enfilcon A, asmofilcon A, efrofilcon A.

Of the above materials, hexane-1,6-diol is water soluble but only temporarily resistant to a silicone hydrogel contact lens formulation, e.g., one shown in Examples. Tetradecanol is insoluble in water, slightly soluble in ethanol, and very well soluble in diethylether. Nonadecane and tetracosane are insoluble in water and insoluble in a silicone hydrogel contact lens formulation, e.g., one shown in Examples.

Application of the material to a mold is conducted at a temperature higher than the melting point of the material to a mold surface having a lower temperature (i.e., which is at or below the melting point of the material). The material, if applied to the mold surface solidifies on the mold surface.

Application of the material to the mold surface can be conducted by a number of techniques, for example by spraying, by fixation, by steaming, by inkjet, by Selective Laser Sintering (SLS) or by Selective Heat Sintering (SHS), or by a combination of those techniques, all of which are known to a person skilled in the art.

For example, ink jet technology may be used as an example of a no-touch technique. In case of using this technique the viscosity of the material preferably is about 20 to 50 mPas at a temperature above the melting point. The application technology may also be more complex, for example a symbol can be applied to the mold surface by depositing a powder, heating it to a temperature at or above the melting point of the powder followed by cooling to e.g. room temperature (SLS). Another example of an application technique is applying a coating to the mold surface, e.g. by steam coating, and generating a symbol within the coating by e.g. evaporating some parts of the coating. Also 3D-printing is a suitable technology.

These application technologies and corresponding equivalent technologies are explicitly included in the process description of applying a material which is liquid, at a temperature higher than the temperature of the mold and which solidifies at the temperature of the mold.

The process disclosed herein, and the uses disclosed herein are advantageous for a number of reasons. For example, the symbol to be applied to a molded device can be changed in each manufacturing cycle, and it is not permanent on the mold. This means that molds having been used in production without any symbols on their surface can now be used according to the disclosed process for making molded devices carrying a symbol, as an indentation, on their surface.

Difficult challenges when cleaning the molds are avoided. It is not possible that residual polymerizable or polymerized composition having been used for making the molded device can be deposited in indentations or elevations on the mold surface as it happens with molds having permanent indentations or elevations. This is so as the elevations on the mold according to the invention are not permanent, but are dissolved or rinsed off during the cleaning process of re-usable molds. If desired, deposits of the composition to be polymerized or of polymerized composition on the mold surface attached thereto for example by diffusion processes can be avoided by applying the material as a complete, non-interrupted coating of the mold.

In contrast to generating elevations on the mold surface by applying UV based inks which then require a UV pre-curing, such pre-curing is not required when using a material according to the invention as said materials are fixed on the mold surface by solidifying based on the temperature differences between the applied material and the mold.

It is also a positive aspect that differences in shrinking between the material and the composition of which the molded device is made do not play a role, while this can generate problems when UV based inks are used to generate elevations on the mold. Such UV based inks can have shrinking parameters different to the composition from which the molded device is made which may result in edge distortions of embedded UV based inks, or in undesired elevations, for example in contact lenses. Such a phenomenon is very disadvantageous as such elevation will create comfort issues, in particular if the elevations are 6 micrometer or higher.

Toxicity tests of the molded devices need not be conducted as for use of UV inks in clinical products provided that the materials used can be dissolved or rinsed off from the molded device as it is the case according to the current invention.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Although various aspects and various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together. Therefore, the spirit and scope of the appended claims should not be limited to the description of the preferred versions contained therein.

EXAMPLE 1

This example illustrates how an orientation mark as a symbol (102) can be molded within a contact lens (101) by an arrangement of dots indicating the toric axis (orientation) to obtain a contact lens with a molded symbol therein (100), as shown in FIG. 1. The large circle illustrates a contact lens (101) to the surface of which dots (102) have been created by the process of the invention.

EXAMPLE 2

This example illustrates how alpha-numerical information as a symbol can be applied to a contact lens (201) by an arrangement of dots representing the information "1A" (202) to obtain a contact lens with a molded symbol therein (200), as shown in FIG. 1. The large circle illustrates a contact lens (201) to the surface of which dots (202) have been applied by the process of the invention.

EXAMPLE 3

A lens forming composition as described in Example 3 or 19 of U.S. Pat. No. 8,480,227 (herein incorporated by reference in its entirety) is used in this Example. The lens forming composition comprises a chain-extended polydimethylsiloxane macromer, N-[tris(trimethylsiloxy)-silylpropyl]acrylamide (TRIS-Am), N,N-dimethylacrylamide (DMA), N-(carbonyl-methoxypolyethylene glycol-2000)-1, 2-disteaoyl-sn-glycero-3-phosphoethanolamin, sodium salt) (L-PEG), Darocur 1173 (DC1173), visitint (5% copper phthalocyanine blue pigment dispersion in tris(trimethylsiloxy)silylpropylmethacrylate, TRIS), and 1-propanol.

Figure 2:
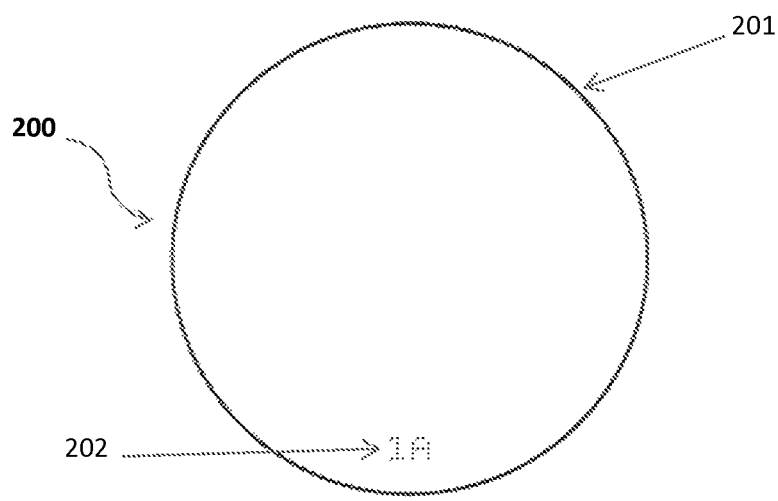
FIG. 2 shows a contact lens with a molded visible symbol therein according to another preferred embodiment.

Nonadecane having a melting point of 34° C. is used to apply dots to a reusable mold (glass female mold half and quartz male mold half), similar to the mold shown in FIGS. 1-6 in U.S. Pat. Nos.7,384,590 and 7,387,759 (FIGS. 1-6). The dots with a pattern shown in FIG. 1 or 2 is applied onto the molding surface of the female mold half at room temperature by dosing liquid nonadecane having a temperature of at least about 2 degrees above 34° C. from a syringe. Nonadecane does not react with the lens forming composition such that filling the mold with the lens forming composition at room temperature and curing the lens forming composition results in a silicone hydrogel contact lens having the dot symbols of FIG. 1 or 2 as indentations on the surface.

EXAMPLE 4

A lens forming composition as described in Example 3 or 19 of U.S. Pat. No. 8,480,227 (herein incorporated by reference in its entirety) is used in this Example. The lens forming composition comprises a chain-extended polydimethylsiloxane macromer, N-[tris(trimethylsiloxy)-silylpropyl]acrylamide (TRIS-Am), N,N-dimethylacrylamide (DMA), N-(carbonyl-methoxypolyethylene glycol-2000)-1, 2-disteaoyl-sn-glycero-3-phosphoethanolamin, sodium salt) (L-PEG), Darocur 1173 (DC1173), visitint (5% copper phthalocyanine blue pigment dispersion in tris(trimethylsiloxy)silylpropylmethacrylate, TRIS), and 1-propanol.

Hexane-1,6-diol having a melting point of 39-42° C. is used to apply dots to a reusable mold (glass female mold half and quartz male mold half), similar to the mold shown in FIGS. 1-6 in U.S. Pat. Nos. 7,384,590 and 7,387,759 (FIGS. 1-6). The dots with a pattern shown in FIG. 1 or 2 is applied onto the molding surface of the female mold half at room temperature by dosing liquid hexanediol having a temperature of at least about 2 degrees above 42° C. from a syringe. Hexanediol does not react with the lens forming composition immediately as it is temporarily resistant such that filling the mold with the lens forming composition at room temperature and curing the lens forming composition results in a silicone hydrogel contact lens having the dot symbols of FIG. 1 or 2 as indentations on the surface.

The invention claimed is:

1. A process for producing a device having a molded, visible symbol therein, comprising the step of:
   (a) obtaining a material in liquid state, a device forming composition and a mold for cast-molding a device from the device forming composition, wherein the mold has a molding surface and a first temperature, wherein the material has a second temperature, wherein the device forming composition has a third temperature, wherein the first temperature is below the melting point of the material, wherein the second temperature is higher than the melting point of the material, wherein the third temperature is equal to or below the first temperature, wherein the material has a melting point between 15° C. and 60° C., is soluble in or can be rinsed off by at least one of water, propanol or methyl ethyl ketone at or above its melting point, and is at least temporarily resistant to the device forming composition for cast-molding the device;
   (b) applying the material in liquid state onto the molding surface of the mold in the form of a symbol before using the mold for cast molding the device, wherein as the material in liquid state is cooling toward to the first temperature, the material is solidified to form the symbol as a solid elevation on the molding surface of the mold;
   (c) introducing the device forming composition into the mold with the symbol as the solid elevation on the molding surface, wherein the solid elevation remains solid; and
   (d) polymerizing or crosslinking the device forming composition in the mold to form the device having the molded, visible symbol as an indentation which is a reproduction of the symbol as the solid elevation on the molding surface.

2. The process according to claim 1, wherein the molded device is a contact lens.

3. The process according to claim 2, wherein the molded, visible symbol is a pattern or alpha-numerical information, a picture, or a combination thereof.

4. The process of claim 3, wherein the molded, visible symbol is a number, a date, a lot number, an orientation mark, an inversion mark, or text without or with numbers.

5. The process of claim 4, wherein the second temperature is about 2° to about 50° C. higher than the first temperature.

6. The process of claim 5, wherein the material has a melting point of from about 18° C. to about 60° C.

7. The process of claim 5, wherein the first temperature and the third temperature is at a room temperature of 23±4° C.

8. The process of claim 7, wherein the material is selected from alcohols and alkanes.

9. The process of claim 8, wherein the material is selected from hexane–1,6-diol, 1-tetradecanol, nonadecane, tetracosane, and combinations thereof.

10. The process of claim 9, wherein the application of the material to the molding surface is conducted by spraying, by steaming, by inkjet, by Selective Laser Sintering (SLS) or by Selective Heat Sintering (SHS), or by a combination thereof.

11. The process of claim 4, wherein the material has a melting point of from about 18° C. to about 38° C.

12. The process of claim 5, wherein the material has a melting point of from about 18° C. to about 38° C.

13. The process of claim 7, wherein the material has a melting point of from about 18° C. to about 38° C.

14. The process of claim 8, wherein the material has a melting point of from about 18° C. to about 38° C.

15. The process of claim 9, wherein the material has a melting point of from about 18° C. to about 38° C.

16. The process of claim 10, wherein the material has a melting point of from about 18° C. to about 38° C.

* * * * *